Sept. 24, 1968  O. KLEB  3,402,951
FASTENING DEVICE
Filed Oct. 25, 1966  2 Sheets-Sheet 1
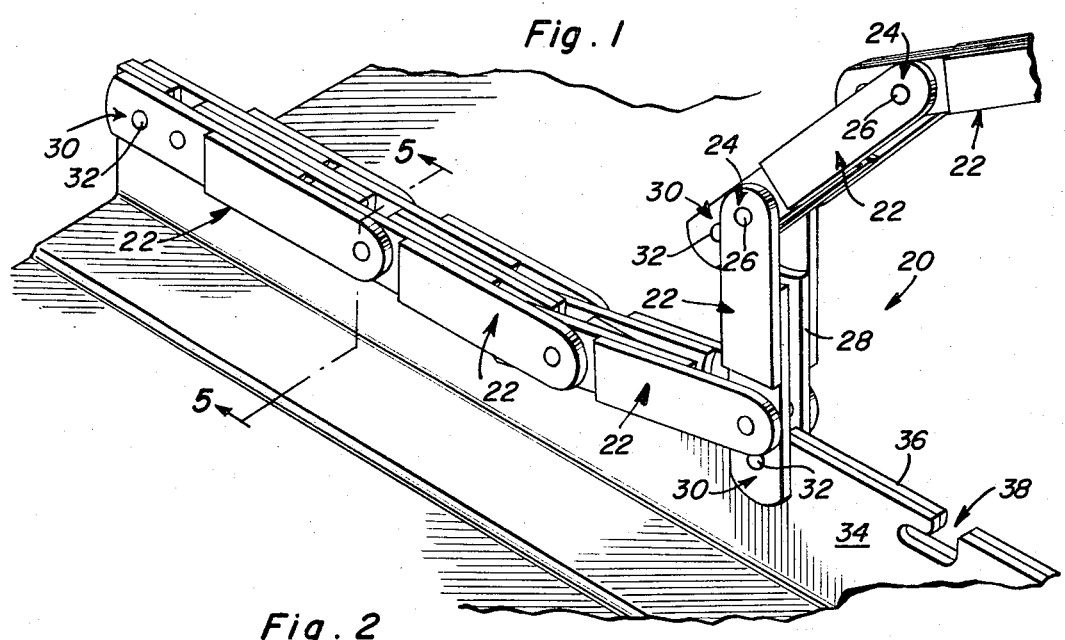
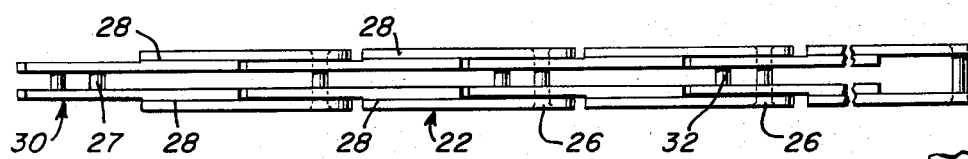
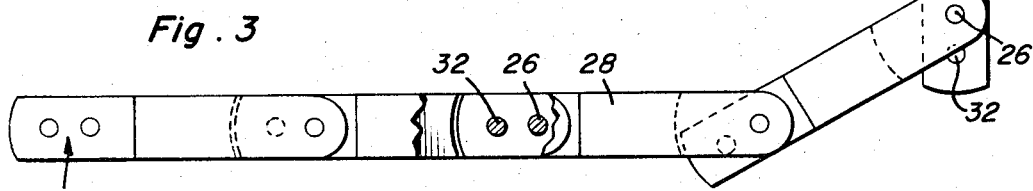
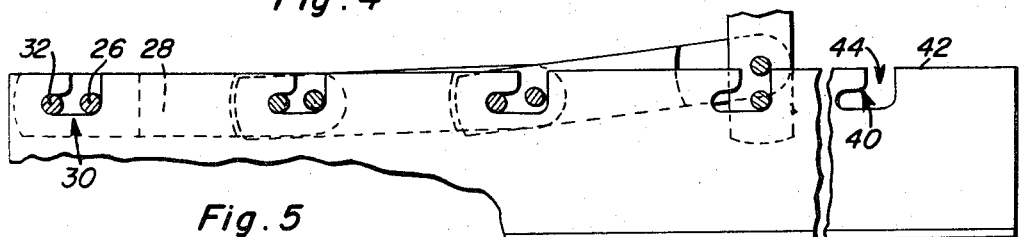
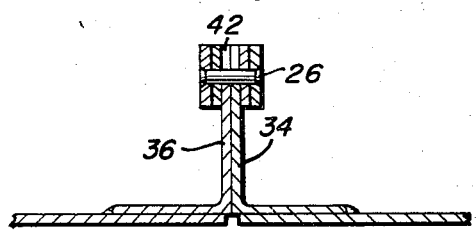
Oscar Kleb
INVENTOR.
BY Clarence A. O'Brien
and Harvey B. Jacobson
Attorneys Sept. 24, 1968     O. KLEB     3,402,951
FASTENING DEVICE
Filed Oct. 25, 1966     2 Sheets-Sheet 2
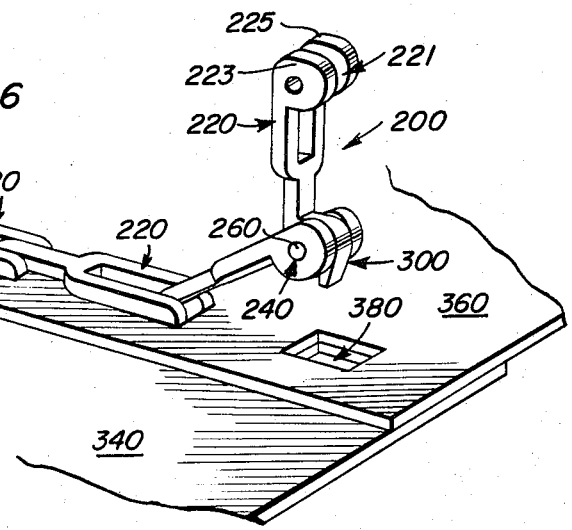
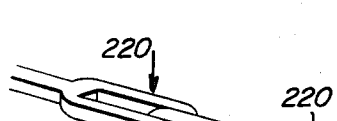
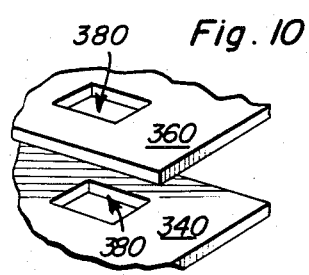
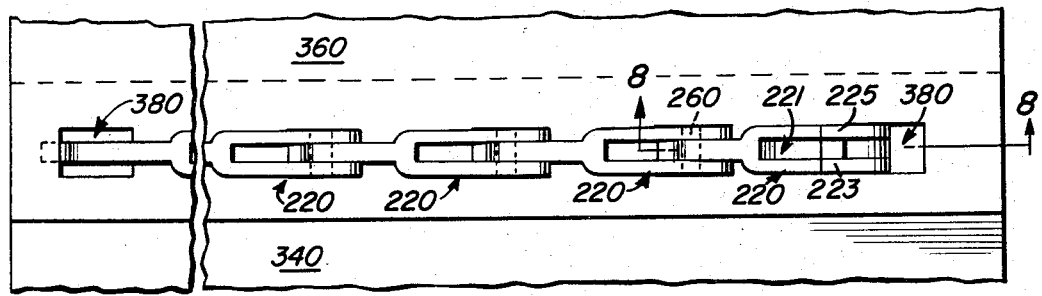
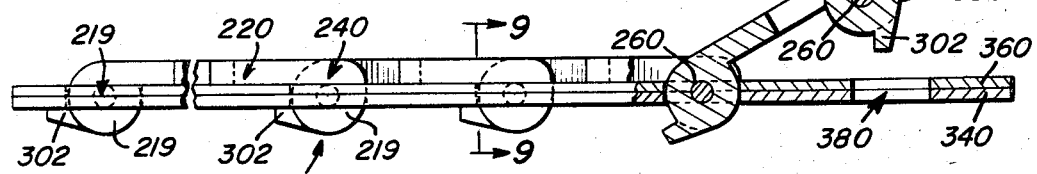
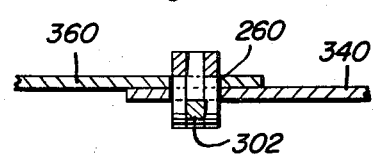
Oscar Kleb
INVENTOR.
BY *Clarence A. O'Brien and Harvey B. Jacobson*
Attorneys

United States Patent Office 3,402,951
Patented Sept. 24, 1968

3,402,951
FASTENING DEVICE
Oscar Kleb, 77 S. Broadway,
Aurora, Ill. 60504
Filed Oct. 25, 1966, Ser. No. 589,268
8 Claims. (Cl. 287—189.36)

ABSTRACT OF THE DISCLOSURE

A fastening device for releasably fastening edge and/or surface aligned sheet material which device comprises a plurality of rigid clamping links, joined in chain-like fashion, and adapted to coact with slots provided in the edge and/or surface aligned sheet members to releasably clamp the members together and wherein each link of the fastening device is engageable into its associated slot in the aligned members when the link is generally normal to the members and whereby when the link is pivoted into the general plane of the members it is in tight engagement with the slots thus fastening the aligned members together.

---

The present invention relates to fastening devices of the type generally suitable for the fastening of edge aligned sheet members. More particularly, the present invention is concerned with the provision of fastening devices for sheet material which fasteners are of a generally chain-like configuration comprising a plurality of fastener elements which coact with the edge aligned sheet members to rigidly and releasably fasten them together.

Numerous fastening devices have been proposed heretofore to both temporarily and permanently secure a plurality of relatively rigid sheet members in contiguous relationship. Conventional fasteners of the aforementioned type generally comprise coactive elements which cooperate with an aperture or slot passing through the sheet material so as to clampingly secure the material between the body of the fastener and a movable abutment or lug projecting through the aperture and engaging the surface of the sheet material opposed to the body of the fastener. Furthermore, many of such fasteners are characterized by an inherent shortcoming in that they rely upon a spring or spring-like element to secure the members to be fastened and thus such fasteners afford relatively little shear resistance inasmuch as the holding capability of such a device depends upon the tension of the spring element.

It is therefore a primary object of the present invention to provide a fastening device for edge aligned and/or surface contiguous fastening of relatively rigid sheet material and the like which fastener is adapted to releasably fasten sheet-like material without the necessity of relying upon a resilient clamping means.

Another object of the present invention is to provide a fastening device of the aforementioned type which comprises a plurality of coacting fastening elements pivotally secured in such a manner so as to form a rigid link, flexible chain-like fastening device for the edge aligned and/or surface-to-surface contiguous fastening sheet material and the like whereby the material may be releasably fastened without the necessity of having to rely on resilient elements to maintain the sheet material in fastened relationship.

A further object of the present invention is to provide an improved device for the fastening of edge aligned and/or surface-to-surface contiguous fastening sheet material and the like which comprises a plurality of clamping links or levers interconnected in a chain-like manner and including body members provided with an integral clamping lug means which coacts with suitable slots in the material to be fastened whereby the clamping lug means securely and positively grips or clamps the material between the lug and the main body portion of the fastening device.

Still a further object of the present invention is to provide an improved fastening device for the over-edge fastening of edge aligned surface-to-surface contiguous sheet material and the like, such as angle irons for example, by means of a rigid link, flexible chain-like fastening device adapted to straddle the edge-to-edge aligned and surface-to-surface contiguous members by means of the engagement of a clamping lug means carried by the links of the fastening device which means engages appropriately aligned slots communicative with the edge of the material to be fastened.

Still a further object of the present invention is to provide a novel fastening device for surface-to-surface aligned relatively rigid sheet material and the like wherein a plurality of generally rigid elongated links are pivotally interconnected to form a rigid, flexible chain-like fastening device having a clamping lug means integral with each of the links which clamping lug means is adapted to pass downwardly through appropriately aligned slots in the overlapping sheet material whereby the material is positively but releasably clamped between the body of the link and the clamping lug means.

Still a further object of the present invention is to provide an improved fastening device for edge aligned and/or surface contiguous sheet material and the like which comprises a plurality of fastening elements connected in series and adapted to be successively engaged with the material to be fastened thereby providing a coextending fastener which may be fabricated to selectively extend along only a portion of or substantially the entire length of a plurality of members to be fastened.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of an exemplary embodiment of a fastening device constructed in accordance with the principles of the present invention and particularly adapted for the fastening of sheet-like members positioned in edge-to-edge alignment and/or surface-to-surface contact, further showing the chain-like nature of the fastening device wherein portions of the fastening device are shown in various sequential positions during fastening of the sheets.

FIGURE 2 is a top plan view of the fastening device of FIGURE 1;

FIGURE 3 is a fragmentary side elevational view of the embodiment of the invention illustrated in FIGURES 1 and 2 with portions broken away to show certain interior details of the means used for articulating the links of the fastening device;

FIGURE 4 is a vertical sectional view further illustrating the manner in which the fastening device cooperates to fasten the edge aligned and surface-to-surface contiguous abutting members;

FIGURE 5 is a vertical transverse fragmentary cross-sectional view taken substantially along the plane of the line 5—5 of FIGURE 1;

FIGURE 6 is a perspective view of another embodiment of a chain-like fastening device constructed in accordance with the principles of the present invention and primarily adapted for the surface-to-surface fastening of overlapping sheet-like members and the like;

FIGURE 7 is a top plan view of the fastening device of FIGURE 6;

FIGURE 8 is a side elevational view of the embodiment of FIGURE 6 with portions shown in cross-section taken substantially along the plane of the line 8—8 of FIGURE 7 and further illustrating the sequential and progressive engagement of the links comprising the fastening device;

FIGURE 9 is a transverse fragmentary cross-sectional view taken substantially along the plane of the line 9—9 of FIGURE 8; and FIGURE 10 is a fragmentary partially exploded view illustrating an exemplary configuration for the aligned elongated slots in the sheet material to be fastened.

Referring now to the drawings and particularly FIGURE 1 it will be seen that the embodiment 20 of the fastening device of the present invention illustrated therein preferably includes a plurality of rigid clamping links indicated generally at 22 provided with connector means indicated generally at 24 which comprise a pivot pin or lug 26 secured such as by pressing, heading over, etc., in suitable apertures provided in the associated links 22. It will therefore be seen that the fastening device 20 in its broadest aspect comprises a rigid link, flexible chain-like device.

As seen best in FIGURES 2 and 3 the clamping links 22 preferably include two generally elongated rigid elements 28 each having a lateral offset so as to facilitate assembly of the elements 28 in a bifurcated configuration by means of the pivot pins 26, which as will be seen clearly hereinafter are of course common to two of the links 22. Thus, the end of one link 22 is dimensioned so as to nestingly and pivotally receive the end of the succeeding link 22 as seen best in FIGURES 1 and 2.

Each of the elongated clamping links 22 is further provided with a clamping means indicated generally at 30 which comprises a clamping lug or pin means 32 secured in spanning relationship between the link elements 28 of each respective link 22. In the embodiment illustrated the pivot pins 26 are each formed of suitable fasteners such as rivets or the like, for example. For reasons which will become apparent hereinafter during a discussion of the operation of the fastening device 20 the initial link 22 in a series, i.e., the link 22 in the upper left hand corner of FIGURE 1, is further provided with a pin 27 located in a position corresponding to the placement of the pin 26 in the succeeding links 22 but only bridging the distance between the opposed link elements 28 inasmuch as a bifurcation such as would be present from a preceding link 22 is not present in overlying relation thereto. As seen best in FIGURES 1 and 4 when utilizing the fastening device 20 to fasten edge aligned and surface-to-surface contiguous elements such as a pair of sheet metal angles 34 and 36, the angles 34 and 36 are provided with a camming lug receiving and locking means 38 which comprises slots each having a plurality of generally elongated portion indicated generally at 40 disposed in generally parallel relation to the edge 42 of the angular members 34 and 36. The portion 40 of the slot means 38 communicates with the edge 42 by means of the provision of a communicating slot indicated generally at 44 preferably generally normal to the portion 40, thus it will be seen that the slot means 38 is preferably a right angle or L-shaped slot.

It will further be understood that the utilization of the fastening means 20 to fasten together the angular elements 34 and 36, which are in turn secured to panel members for example, is merely exemplary of one utility for the chain-like fastening device 20 and accordingly it will be understood that its use is not necessarily restricted thereto.

Referring now to another embodiment of a fastening device produced in accordance with the present invention it will be seen that the fastening device indicated generally at 200 in FIGURES 6–10 includes a plurality of clamping links indicated generally at 220 which are pivotally connected to form a rigid link, flexible chain-like fastener by utilization of pivot means indicated generally at 240.

The clamping links 220 are of generally elongated form and are provided with a bifurcation indicated generally at 221 defined by the fingers 223 and 225 of the links 220 at one end thereof, and a downwardly and forwardly projecting clamping means 300 integral with the clamping link 220 which includes a clamping lug portion 302 sized so as to clampingly engage sheet material or the like such as the surface-to-surface aligned sheet elements 340 and 360 between the clamping lug 302 and the body of the link 220.

Toward this end, as will be seen best in FIGURES 8 and 10 the sheet material to be fastened by the fastening device 200 is provided with a plurality of generally elongated slots indicated generally at 380, which as seen in FIGURE 8 are positioned so as to be in generally arcuate alignment with the clamping means 300 of each of the clamping links 220. As seen best in FIGURE 8 the bifurcated clamping links 220 are provided with downwardly projecting enlarged generally planar terminal portions 217 having centrally disposed apertures 219 therein for the reception of pivot means 240 comprising rivets, bolts, etc. The enlarged terminal portions 217 of the clamping links 220 are sized so as to span substantially the entire length of the slots 380 thus generally eliminating any possible horizontal movement of the fastened members 340 and 360.

In addition the centrally disposed apertures 219 are preferably positioned in the enlarged terminal portion 217 of the clamping link 220 so as to be on a plane generally analogous to the plane of the contiguous surfaces of the sheet members 340 and 360.

Although not discussed in detail heretofore it will be appreciated that while the embodiment 20 of the fastening device of the present invention is illustrated herein as being fabricated from sheet material such as metal, it may also be constructed of composition board, relatively rigid plastic, etc. It will also be appreciated that the clamping link 22 may also be fabricated by casting, forging, stamping or any other suitable means without departing from the principles of the invention. It will further be appreciated that the embodiment 200, illustrated as being formed by casting, forging, etc., may also be fabricated from sheet material. In addition, it will still further be appreciated that the pivot means 24 and 240, which in the embodiments illustrated comprise solid rivets for example, may also comprise any other suitable type of pivot pin which may be press-fit or otherwise secured while still permitting pivotal movement of the clamping link carried thereby.

Referring now to the operation of the fastening devices 20 and 200 and particularly the embodiment illustrated in FIGURES 1 and 4 it will be appreciated, as indicated heretofore that the fastening device 20 illustrated therein is primarily adapted for the fastening of edge aligned surface-to-surface contiguous elements which may for example comprise a portion of a panel joint. As seen in FIGURE 1 the angular members 34 and 36 provided with the slot means 38 are placed in edge aligned surface-to-surface contiguous relationship and starting from the left the initial link 22 of the fastening device 20 is secured in its associated slot means 38 by inserting the clamping lug 32 downwardly into the slot portion 44 of the slot means 38 so as to come to rest against the left hand end of the horizontal portion 40 of the slot means 38. The fastening of the succeeding link is begun in a similar manner starting with the link substantially normal, that is to say at right angles to the horizontal slot portion 40 or parallel with the slot portion 44 such as best seen in FIGURE 1, after which the link is pivoted clockwise from its normal position to that substantially parallel to the slot portion 40 thus locking the preceding link in its associated slot means 38. Although not shown, it will be appreciated that the final link in the fastening device 20 may, if desired, be secured such as by means of a pin or the like so as to preclude inadvertent release of the last link in the chain. It will thus be appreciated that the preceding links in the chain comprising the fastening device 20 are positively precluded from being released.

Referring now to the operation of the embodiment of the invention illustrated in FIGURES 6–10, it will be appreciated that the embodiment 200 illustrated therein is primarily, although not necessarily, adapted for the surface-to-surface fastening of sheet material and the like. Toward this end, two sheet material members such as for example the members 340 and 360, provided with appropriately positioned communicating slots such as 380, may be fastened by inserting the first link 220 in the chain-like series, such as the left hand link 220 as seen in FIGURE 8, into the slot means 380 by positioning the link 220 approximately normal to the plane of the sheet material and pivoting the link 220 clockwise so as to cause the enlarged terminal portion 217 provided with the clamping lug 302 of the clamping means 300 to pass downwardly through the slot means 380 and clampingly secure the sheet members 340 and 360 between the clamping lug 302 and the main body of the clamping link 220. In a manner analogous to that described hereinabove with respect to the embodiment 20, successive links 220 of the embodiment 200 are brought into clamping engagement by aligning them with their associated slot while the clamping link 220 is generally normal to the plane of the sheet material and then pivoting them clockwise about their associated pivot pins 260 so as to successively engage the clamping means 300 with its associated slot as seen best in FIGURE 8. As indicated hereinabove the enlarged terminal portions are sized so as to preclude shifting of the sheet members 340 and 360 thus assuring accurate alignment thereof. As with the final link of the embodiment 20 the final link in the fastening device 200 may be secured by means of a pin or the like so as to preclude its being inadvertently pivoted from a plane parallel to the sheet material, that is to say in a locked position, to a position normal to the sheet or unclamped position. Thus it will be seen that preceding links 220 of the chain-like fastening device 200 are precluded from being released until the final link, that is the farthest most like to the right, is released.

From the foregoing it will be appreciated that a fastening device produced in accordance with the present invention may be advantageously utilized to accurately fasten two or more sheet members in a positive manner either temporarily or permanently. Furthermore it will be appreciated that by accurately forming the slot means such as 38 or 380 in the members to be fastened and appropriately sizing the associated elements of the clamping means 30 or 300 so as to provide only a minimum of clearance, and thus a minimum of play, the members to be fastened will be precluded from any significant amount of movement.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

I claim:
1. A fastening device in combination with a pair of separate edge aligned sheet members comprising a plurality of generally rigid elongated clamping links, each of said links being provided with means at one end thereof pivotally connecting said links to form a rigid-link flexible chain, each of said links being provided intermediate said one end and the opposite end thereof with integral clamping lug means, said lug means coacting with suitable slots provided in said members whereby said lug means is inserted into said slots when said link is generally normal to the edges and surfaces of the members and is releasably secured when said link is pivoted into the general plane of said members thereby camming said lug means into tight engagement with said slots.

2. A fastening device in combination with a pair of separate edge aligned sheet members comprising a plurality of generally rigid elongated clamping links, each of said links being provided with means at one end thereof pivotally connecting said links to form a rigid-link flexible chain, each of said links including a first and a second elongated link portion, means securing said link portions in coextending generally parallel spaced apart relationship, said links being spaced apart a sufficient distance so as to straddle said members, each of said links being provided intermediate said one end and the opposite end thereof with integral clamping lug means, said lug means coacting with suitable slots provided in said members whereby said lug means is inserted into said slots when said link is generally normal to the edges of said sheet members and is releasably secured when said link is pivoted into the general plane of said members, thereby camming said lug means into tight engagement with said slots.

3. The combination of claim 2 wherein said means pivotally connecting said links and said means securing said link portions in coextending generally parallel spaced relationship comprises a pivot pin providing both the pivot and spacing means.

4. The combination of claim 3 wherein said pivot means is disposed inwardly of one end of said link and said clamping lug means comprises a clamping pin extending between said coextending generally parallel spaced apart link portions, said clamping pin being positioned between said pivot pin and the end of said link.

5. A fastening device in combination with a pair of separate surface-to-surface contiguous sheet members comprising a plurality of generally rigid elongated clamping links, each of said links being provided with means at one end thereof pivotally connecting said links to form a rigid-link flexible chain, each of said links being provided intermediate said one end and the opposite end thereof with integral clamping lug means, said lug means coacting with suitable slots provided in said members whereby said lug means is inserted into said slots when said link is generally normal to the surfaces of the sheet members and is releasably secured when said link is pivoted into the general plane of said members, thereby camming said lug means into tight engagement with slots.

6. The combination of claim 5 wherein said clamping links are provided with at least one bifurcated end nestingly and pivotally receiving the end of a succeeding link pivotally secured by said pivot means and said clamping lug extends downwardly and forwardly of said pivot means.

7. The combination of claim 5 wherein said clamping links are provided with at least one bifurcated end nestingly and pivotally receiving the end of a succeeding link pivotally secured by said pivot means, said clamping links including downwardly projecting enlarged generally planar terminal portions, said terminal end portion carrying said clamping lug.

8. The combination of claim 5 wherein said clamping lug means comprises a clamping lug extending downwardly below the general plane of the contiguous sheet members.

References Cited
UNITED STATES PATENTS 689,764  12/1901  Titus _____ 74—245

FOREIGN PATENTS 244,388  3/1912  Germany.

CARL W. TOMLIN, *Primary Examiner.*

R. S. BRITTS, *Assistant Examiner.*